Dec. 6, 1955   I. W. BACHRACH   2,725,923
COMBINED SETTEE AND COVER
Filed Feb. 18, 1953
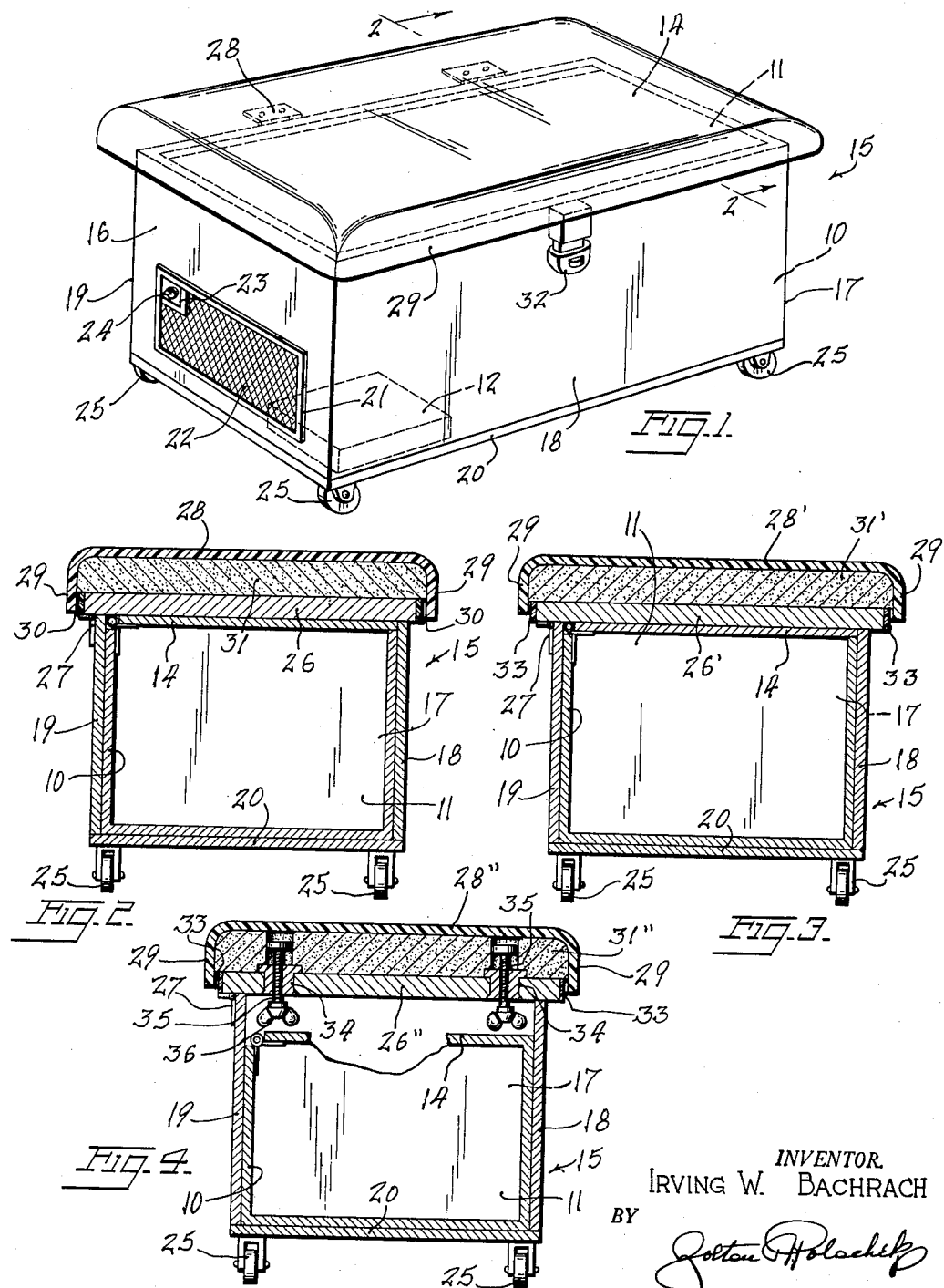
INVENTOR.
IRVING W. BACHRACH
BY
ATTORNEY

United States Patent Office 2,725,923
Patented Dec. 6, 1955

2,725,923

COMBINED SETTEE AND COVER

Irving W. Bachrach, Brooklyn, N. Y., assignor, by mesne assignments, to Cooler King Inc., Brooklyn, N. Y.

Application February 18, 1953, Serial No. 337,513

1 Claim. (Cl. 155—114)

This invention relates to an article of furniture serving as a cover for a refrigeration unit, such as a deep freeze unit, and at the same time serving as a seat of the settee type.

Kitchens and kitchenettes of modern homes are restricted in space and an assortment of apparatus is placed on the floors thereof, such as refrigeration apparatus of the deep freeze type. This apparatus takes up considerable floor space, leaving little or no space for chairs and the like. Furthermore, such apparatus is often unsightly.

It is a prime object of the present invention to utilize the floor space of the modern kitchen or kitchenette to its fullest extent by providing a cover for a deep freeze unit, which cover serves as a seat of the settee type.

Another object of the invention is to provide a cover for a deep freeze unit with a seating surface which is adjustable vertically.

A further object of the invention is to provide a cover for a deep freeze unit which permits ready access to the deep freeze unit.

Yet another object of the invention is to provide a cover for a deep freeze unit with a seating surface which is durable, comfortable and pleasing in appearance.

A still further object of the invention is to provide a device of this character which is characterized by fewness of parts and is capable of being easily trundled in all horizontal directions.

It is a further object of the present invention to provide a combined settee and deep freeze unit which is simple and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

On the accompanying drawings forming a material part of this disclosure:

Fig. 1 is a perspective view of a combined settee and deep freeze unit embodying the invention.

Fig. 2 is a vertical sectional view along the line 2—2 of Fig. 1, with the deep freeze unit omitted.

Fig. 3 is a similar view of a modified form of the invention.

Fig. 4 is a similar view of another modification of the invention.

Referring to the drawings, a deep freeze unit of conventional construction, is included in a casing 10, having a compartment 11 for storing perishables for a long period of time. The compartment is of a comfortable depth for reaching the contents by hand. Underneath the compartment 11 at one end of the casing, is a compartment 12 for housing the usual refrigeration machinery (not shown). The refrigeration machinery may be of the conventional electrically operated compressor condenser-expander type. The refrigerant which emerges from the refrigeration machinery circulates through the usual coil which is suitably supported on the inner surface of the compartment 11. The top of the compartment is open and may be sealed by a hinged cover 14. According to the present invention, a cover or enclosure for the deep freeze unit is provided in the form of a settee 15, having an elongated rectangular-shaped wooden box-like body with side walls 16 and 17, front and rear walls 18 and 19, respectively, and a floor wall 20 suitably fastened together by cementing, nailing or in any other suitable manner.

The side walls 16 and 17 may be formed with windows 21 (only one being shown), each window being provided with a screen 22 and a plate 23 for supporting an electric switch 24 for the refrigeration apparatus may be mounted in one corner of one of the windows. The box body moves on casters 25, fastened to the floor wall 20, adjacent the corners of the box body. A wooden cover member 26 is hingedly fastened to the top of the rear wall 19 by hinges 27, with its edges protruding outwardly of the side and end walls.

A seat section 28 of plastic material, of inverted U-shape in cross-section, is positioned above the cover 26, leaving a space therebetween. The seat section extends over the entire area of the cover with the lower end of its downwardly extending sides 29 cemented or otherwise suitably fastened to the outer edges of the cover 26, as indicated at 30. Padding or cushioning material 31 is stuffed between the seat section 28 and the cover 26. A comfortable seating surface capable of seating two or more persons, is thus provided. The seat section may be of any desired color in order to enhance the appearance of the settee. The cover 26, with its seat section 28, may be releasably held in closed position by a latching device 32.

In use, the deep freeze unit is placed inside the box-like body of the settee where it is concealed from view. Access to the deep freeze unit may be readily made by lifting the cover 26 of the settee and lifting the cover 14 of the deep freeze unit.

In the modification illustrated in Fig. 3, the seat section 28' is of plastic and is not secured to the cover 26' so that it is adapted to move up and down along the protruding edges of the cover. In this form, the outer edge of the cover may be finished with a strip 33 of plastic or other suitable decorative material. The resiliency of the padding material 31' permits this movement and returns the seat section 28' to uppermost normal position. A seat section having a cushioning effect is thus produced for persons of all sizes.

In all other respects, the form of invention shown in Fig. 3 is similar to the form shown in Fig. 1 and similar reference numerals are used to indicate similar parts.

Fig. 4 shows another modified form of the invention having a slidable seat section 28" of plastic and cushioned by the padding material 31", similar to the seat section 28' of the form of Fig. 3. In this form however, means are provided for limiting the movement of the seat section. For this purpose, the cover 26" of the settee is provided with a number of adjusting or limiting units, each unit comprising an internally screw threaded sleeve 34 extending through an opening in the cover 26". An externally threaded shaft 35 is received in the sleeve and is provided with a head in the form of a wing head 36 on its outer end. The other end of shaft 35 is provided with a stop disk 37 against which cover 28" seats. The shaft is sufficiently long to engage the inner surface of the seat section 28".

One of these limiting units is preferably mounted along each side and end wall but any desired number may be used. It will be understood that by setting up on the shafts, the depth of movement of the seat section 28" is readily controlled.

It is to be understood that the seats 28, 28' and 28" may be made of any material such as plastic sheet, woven bamboo cane strips, fabric or the like and formed with suitable pattern, color and design.

While I have illustrated and described the preferred embodiments of my invention, it is to be understood that I do not limit myself to the precise constructions herein disclosed and the right is reserved to all changes and modifications as defined in the appended claim.

Having thus described my invention, what I claim as new, and desire to secure by United States Letters Patent is:

A combined settee and cover for a deep freeze unit comprising an elongated wooden box-like body having a hinged cover, and inverted U-shaped plastic seat section over said hinged cover and slidable downward toward and away therefrom, padding material between the hinged cover and seat section, and means for controlling the downward movement of said seat section including screw-threaded shafts carried by the cover and adapted to engage the seat section, said screw-threaded shafts including flat disks upon the upper ends thereof adapted to act as stop means to limit downward movement of said seat section.

References Cited in the file of this patent

UNITED STATES PATENTS

| | | |
|---|---|---|
| 316,444 | Burr | Apr. 28, 1885 |
| 1,077,199 | James | Oct. 28, 1913 |
| 1,264,265 | Brusius | Apr. 30, 1918 |
| 2,053,471 | Frost | Sept. 8, 1936 |
| 2,247,291 | Doig | June 24, 1941 |
| 2,616,486 | Hawley et al. | Nov. 4, 1952 |

FOREIGN PATENTS

| | | |
|---|---|---|
| 99,091 | Austria | Jan. 26, 1925 |